(12) United States Patent
Geremia

(10) Patent No.: US 9,133,702 B2
(45) Date of Patent: Sep. 15, 2015

(54) ALTERNATING PISTON PUMP

(75) Inventor: Ivo Antonio Geremia, Sao Leopoldo-RS (BR)

(73) Assignee: Rijeza Industria Metalurgica LTDA, Sao Leopoldo-RS (BR)

( * ) Notice: Subject to any disclaimer, the term of this patent is extended or adjusted under 35 U.S.C. 154(b) by 340 days.

(21) Appl. No.: 13/822,162

(22) PCT Filed: Sep. 8, 2011

(86) PCT No.: PCT/BR2011/000331
§ 371 (c)(1),
(2), (4) Date: Mar. 11, 2013

(87) PCT Pub. No.: WO2012/031344
PCT Pub. Date: Mar. 15, 2012

(65) Prior Publication Data
US 2013/0160642 A1    Jun. 27, 2013

(30) Foreign Application Priority Data
Sep. 10, 2010 (BR) .................................. 1003350

(51) Int. Cl.
*E21B 43/38* (2006.01)
*F16J 1/00* (2006.01)
*E21B 43/12* (2006.01)

(52) U.S. Cl.
CPC ............... *E21B 43/38* (2013.01); *E21B 43/126* (2013.01); *F16J 1/00* (2013.01)

(58) Field of Classification Search
CPC ......... E21B 3/126; E21B 3/121; E21B 43/32; E21B 43/38
USPC .......................... 92/162 R, 169.1; 166/105.5
See application file for complete search history.

(56) References Cited

U.S. PATENT DOCUMENTS

| 5,176,216 A | 1/1993 | Slater et al. |
| 5,309,998 A * | 5/1994 | Rivas et al. ................... 166/265 |
| 6,182,751 B1 | 2/2001 | Koshkin et al. |

FOREIGN PATENT DOCUMENTS

BR    PI0604983 A    7/2008

OTHER PUBLICATIONS

International Serach Report issued in corresponding application No. PCT/BR2011/000331 mailed Oct. 31, 2011.

* cited by examiner

*Primary Examiner* — Thomas E Lazo
(74) *Attorney, Agent, or Firm* — Carter, DeLuca, Farrell & Schmidt, LLP

(57) ABSTRACT

An alternative piston pump employed in mechanical pumping systems for oil extraction. The alternative piston pump includes a case part having at least one cavity disposed along its inner surface. Thus, during the pumping cycle, a gas transfer from a bottom chamber to the case part above a piston and an oil transfer from the case part above the piston to the bottom chamber is established.

19 Claims, 13 Drawing Sheets

ALTERNATING PISTON PUMP

TECHNICAL FIELD

The present disclosure refers to an improvement for alternative piston pump, and particularly to an improvement for alternative piston pump employing mechanical pumping systems for oil extraction.

BACKGROUND OF RELATED ART

In the oil extraction field, when well downhole pressure is sufficiently high, fluids contained therein naturally reach the surface. In this case, those wells are named flow well and oil production occurs by means of natural elevation. Thus, when well downhole pressure is relatively low, in order fluids contained therein reach surface or the production capacity is increased, it is required to employ any elevation artificial method.

Among those elevation artificial methods, the most widely used, particularly for onshore rigs, is the mechanical pumping system for oil extraction. This system is basically composed of three parts, which are interrelated, as described below.

The first part is called a mechanical pump unit, which is installed on the well surface and is basically comprised by a motor or engine, a gearbox and a piston rod-crank-rocker arm mechanism, which is responsible for transforming rotary movement into alternative movement, and transfer it to the system secondary part named rod column.

The rod column comprises a series of interconnected rods involved by a pipe column, also known as production column, both extending from surface to oil well downhole. The system third part is installed on the pipes column bottom edge, in case it is an alternative piston pump.

The alternative piston pump, also known as well downhole pump, comprises a case with its top edge connected to the tube column bottom edge and a case piston with its top edge connected to the rod column bottom edge. Besides, the alternative piston pump comprises a ball-seat type stationary valve, also known as foot valve, fixed to case bottom and a ball-seat type travelling valve, also known as exhaust valve, contained on piston bottom part.

The alternative ascending and descending movement produced at mechanical pumping unit is transferred to the rod column, and from there to alternative piston valve, making a contained fluid on the reservoir to be elevated by means of the pipe column to well's surface.

In more details, on a pumping cycle, during the ascending movement, a piston elevates a fluid column contained on case part above itself and generates a thrust over the stationary ball valve so making it elevating from its seat and float, in such a way the fluid is aspired from well to bottom chamber between the stationary valve and exhaust valve. Thus, the stationary valve serves as a fluid intake valve of an oil reservoir to an alternative piston pump. Yet, during its ascending movement, the exhaust valve is closed, i.e., with its ball under the seat, due to the fluid column pressure above itself.

During the ascending movement, the piston puts strength over fluid contained on bottom chamber, closing the stationary valve and opening the exhaust valve allowing bottom chamber fluid to travel to the piston inner chamber, which communicates with pipe column. Thus, the exhaust valve serves as an alternative piston pump fluid discharge valve for pipe column.

Over the years several improvements were developed for this mechanical pumping system. However, a major problem remains without a satisfactory solution, as described below.

It is known that the fluid contained inside the wells is made of a non homogeneous mixture of oil and gas. Gas parts are extremely harmful as they make an alternative piston pump inefficient, most of the times causing shutdowns on fluid elevation draining.

In more details, during the piston ascending movement and subsequent stationary valve opening, gas parts are admitted to bottom chamber. Those gas parts as they are less dense than oil accumulate on bottom chamber top part. Otherwise, it is not possible to open the exhaust valve during piston descending movement, as it happens in normal operation. This happens due to the fact that a gas is a compressible fluid, unlike oil. Thus, during piston descending movement, a gas does not impose necessary strength for the exhaust valve ball to float, and ends up being compressed. So the gas is compressed and expanded alternately without the exhaust valve opening, i.e., without bottom chamber gas discharge for piston inner chamber, thus interrupting the fluid elevation draining.

This problem arises a series of inconveniences. For example, for gas suction, a special operation should be performed, using an auxiliary pumping system. All this operation is time and cost demanding, besides other difficulties inherent to the process.

To avoid this problem the document BRPI0604983-4 proposes a gas-liquid separator installed on producing well downhole before the pump. Such separator comprises an external cylinder capsule divided in four distinct chambers, namely: intake chamber, separated fluid chamber, pumping chamber and gas chamber. The fluid containing oil and gas is collected for the intake chamber through a set of holes. Inside the instrument the fluid is forced downwards following along a spiral. Along this path, the gas, by gravitational and centrifugal effect tends to be separated from oil, being collected by holes located at a wall intersection of an intermediary concentric pipe with the spiral. Gas is then directed to the space between an intermediary concentric pipe inner wall and suction pipe external wall, where it is directed to a gas chamber and released inside the well by means of discharge holes. Descending oil flow, which had its gaseous fraction separated, reaches a separated fluid chamber. Inside that chamber the oil goes up through a suction pipe until reaching a pumping chamber, from where fluid is propelled by the original pumping system, for example, a mechanical pumping system with alternative piston pump.

As it can be seen, the proposed separator according to BRPI0604983-4 is an additional instrument installed on the original pumping system presenting several specific elements provided on a extremely complex setup. Therefore, this solution presents a high cost, besides requiring constant maintenance.

Aiming to provide a solution for shutdown on gas in fluid elevation draining, for oil extraction mechanical pumping systems, as well as aiming to present an alternative solution to that proposed in document BRPI0604983-4, the present invention proposes an improvement for alternative piston pump, characterized by its case containing at least one cavity provided along with its inner surface.

SUMMARY

The main invention embodiment has several cavities formed by the empty space between adjacent concentric rings disposed along with the inner surface of a coating where that said coating is inserted on the inner alternative piston pump case surface. Also, on the main invention embodiment, the coating is made of rubber, which is manufactured by a vulcanization process.

Once gas parts are admitted on the bottom chamber through a stationary valve, and the exhaust valve opening problem is established due to gas lack of resistance with its subsequent compression, the cavities will serve as gas housing, making it possible, along with the piston alternative ascending and descending movement, to be transferred from that said bottom chamber to the case part above piston without passing through the exhaust valve.

Thus, during the pumping cycle, a gas transfer from bottom chamber to the case part above piston the the bottom chamber is established.

This transfer will continue up to a moment in which an enough amount of oil is contained at the bottom chamber, on a piston descending movement, imposing the necessary resistance for exhaust valve ball floating, in such a way to establish a pumping normal flow with a fluid discharge to piston inner chamber and from that to pipe column up to the surface.

Therefore solving the shutdown on gas in fluid elevation draining problem, for oil extraction mechanical pumping systems. In comparison to other ways to solve this problem, specially those ways revealed by BRPI0604983-4, the proposed solution by the actual invention presents significant advantages.

For example, the coating holding concentric rings over its inner surface is an unique component, easily manufactured and a low production cost, which is inserted over the alternative piston pump case inner surface. Therefore, the proposed coating in connection to case form as a sole assembly, opposed to that presented on BRPI0604983-4, where to solve the problem, it is proposed an additional instrument installed on the original pumping system presenting several specific elements disposed on an extremely complex setup. Moreover, according to performed tests, the proposed coating has a long lifetime, maintenance free. At the end of its lifetime it can be easily replaced with a new coating.

BRIEF DESCRIPTION OF THE DRAWINGS

The invention will be better understood from the following detailed description, which will be better seen by means of figures, namely.

DETAILED DESCRIPTION

As previously described, the mechanical pumping system of oil extraction is basically comprised of three parts, named mechanical pumping unit (no figure representation), rod column (30) and alternative piston pump (40).

The mechanical pumping unit is installed on the well surface and it is basically comprised by an electrical motor or combustion engine, a gearbox and a piston rod-crank-rocker arm mechanism, which is responsible for transforming motor/engine rotary movement into alternative movement and transfer it to rod column (30).

The rod column (30) comprises a series of interconnected rods involved by a pipe column (20), also known as production column, both extending from surface to oil well downhole. On the pipe column (20) bottom edge is installed the alternative piston pump (40).

Figure 1:
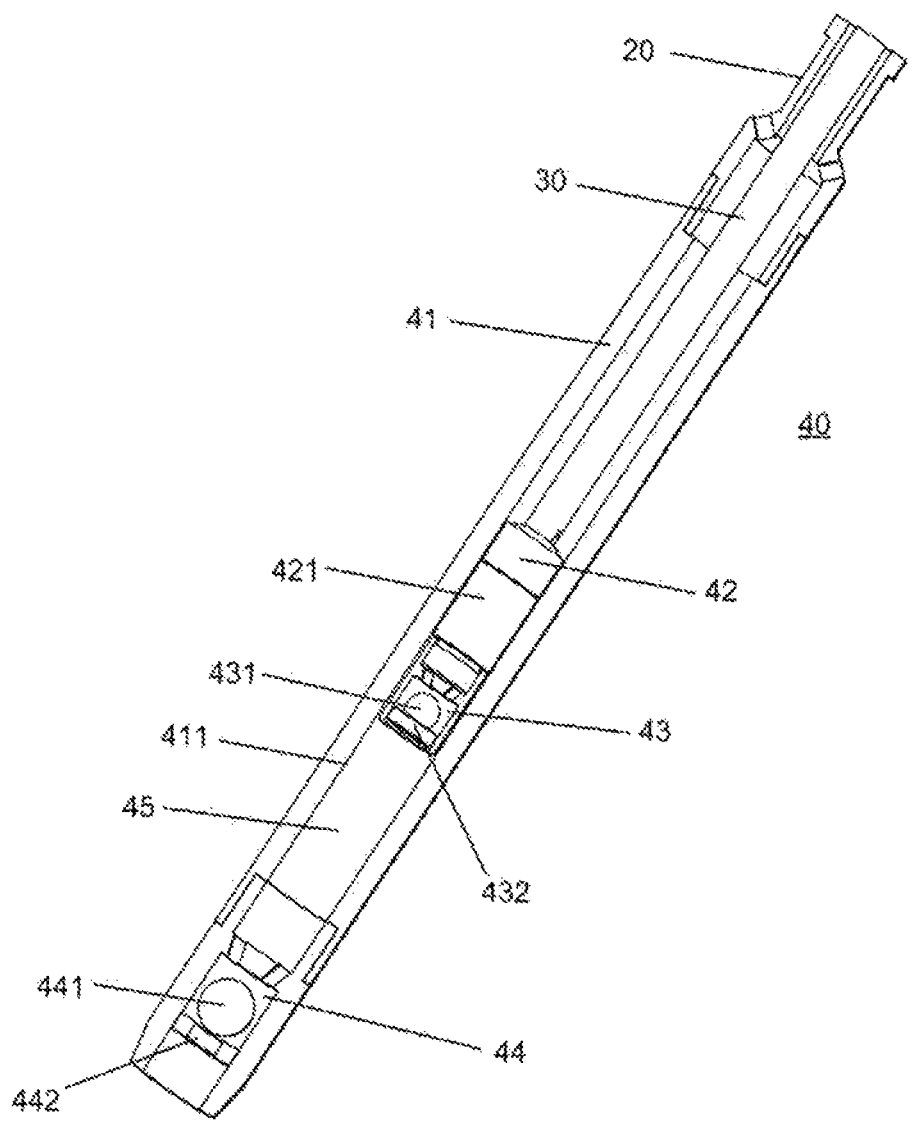
FIG. 1 presents a cut perspective view of an alternative piston pump (40), which is the state of the art.

The alternative piston pump (40), which is the state of the art, as can be seen on FIG. 1 comprises a case (41) with its top edge connected to a pipe column bottom edge (20) and a piston (42), inside the case (41) and with its top edge connected to rod column bottom edge (30). Besides, the alternative piston pump (40) comprises a ball-seat type stationary valve (44), also known as foot valve, fixed to case (41) bottom edge and a ball-seat type travelling valve (43), also known as exhaust valve, contained on piston bottom part (42).

The alternative ascending and descending movement produced at mechanical pumping unit is transferred to the rod column (30), and from there to an alternative piston valve (40), making a contained fluid on the reservoir to be elevated by means of the pipe column (20) to well's surface.

Figure 2:
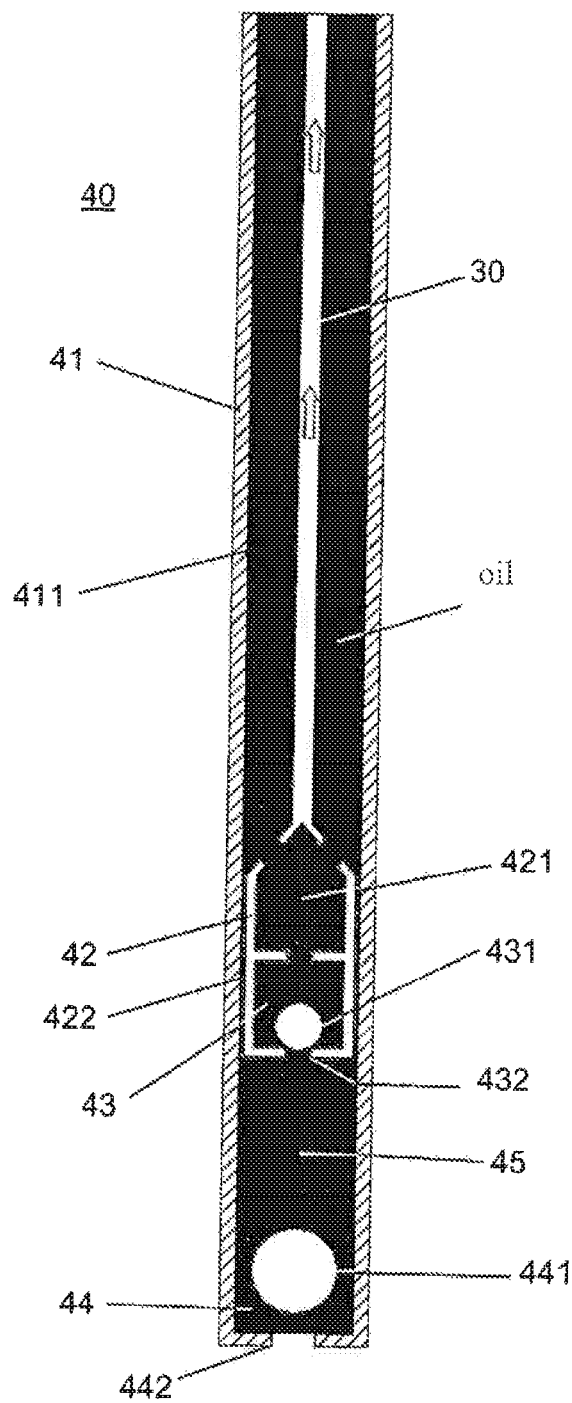
FIG. 2 presents a cut schematic view of an alternative piston pump (40), which is the state of the art, with piston (42) on its ascending movement.

In more details, on a pumping cycle, during the ascending movement, as it can be seen on the schematics on FIG. 2, a piston (42) elevates a fluid column contained on case part (41) above itself and generates a thrust over the stationary ball valve (44) so elevating it from its seat (441) and floating, in such a way the fluid is aspired from well to bottom chamber (45) between the stationary valve (44) and exhaust valve (43). Thus, the stationary valve (44) serves as an intake valve from oil reservoir fluid to an alternative piston pump (40). Yet, during its ascending movement, the exhaust valve (43) is closed, i.e., with its ball (431) under the seat (432), due to the fluid column pressure above itself.

Figure 3:
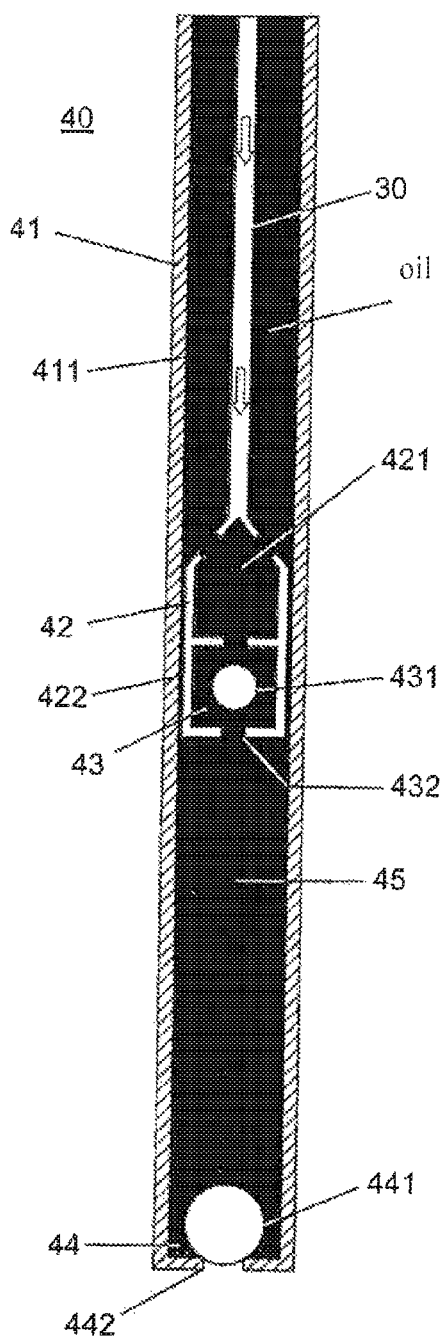
FIG. 3 presents a cut schematic view of an alternative piston pump (40), which is the state of the art, with piston (42) on its descending movement.

During the ascending movement, as it can be seen on schematics FIG. 3, the piston (42) puts strength over fluid contained on bottom chamber (45), closing the stationary valve (44) and opening the exhaust valve (43) allowing bottom chamber (45) fluid to travel to the piston (42) inner chamber (421), which communicates with pipe column (20). Thus, the exhaust valve (43) serves as an alternative piston pump fluid discharge valve (40) for pipe column (20).

It is known that the fluid contained inside the wells is made of a non homogeneous mixture of oil and gas. Gas parts are extremely harmful as they make an alternative piston pump (40) inefficient, most of the times causing shutdowns on fluid elevation draining.

Figure 4:
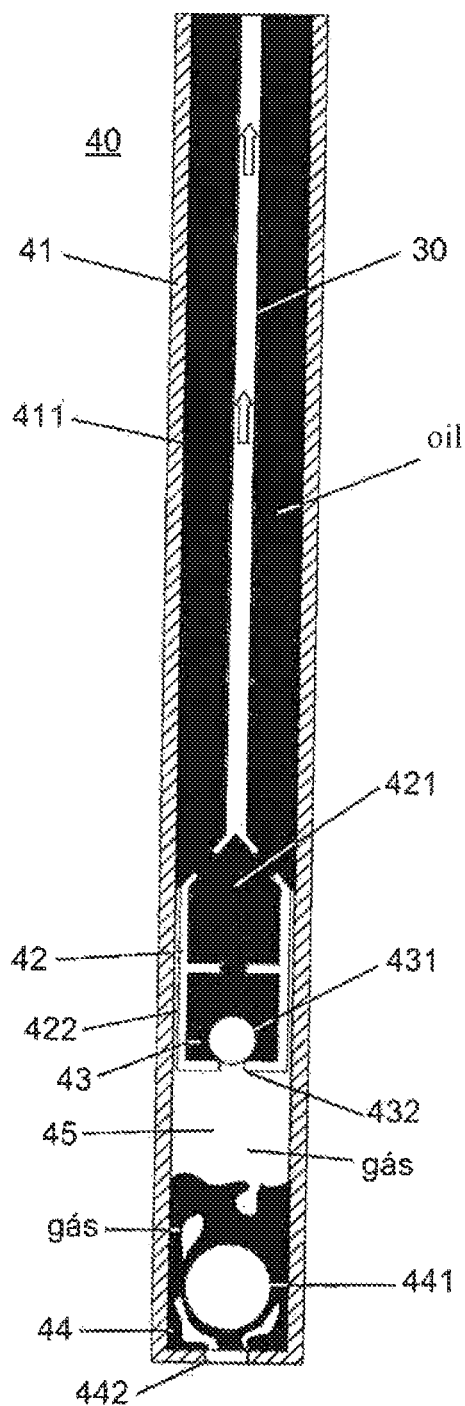
FIG. 4 presents a cut schematic view of an alternative piston pump (40), which is the state of the art, with piston (42) on its ascending movement, with gas parts admitted on bottom chamber (45).
Figure 5:
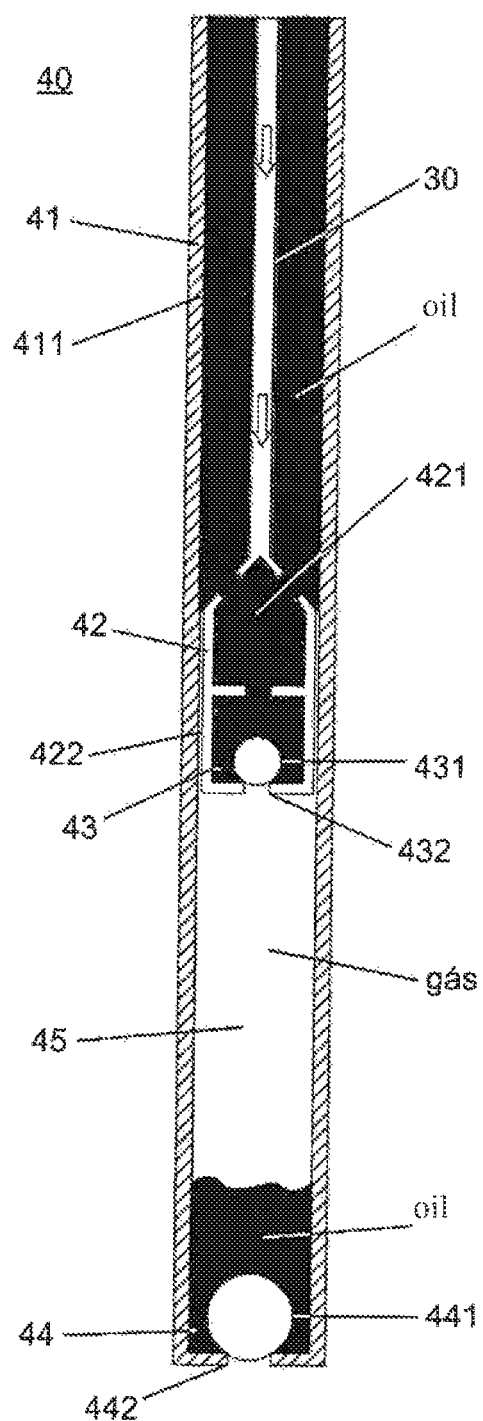
FIG. 5 presents a cut schematic view of an alternative piston pump (40), which is the state of the art, with piston (42) on its descending movement, with gas parts admitted on bottom chamber (45).
Figure 6:
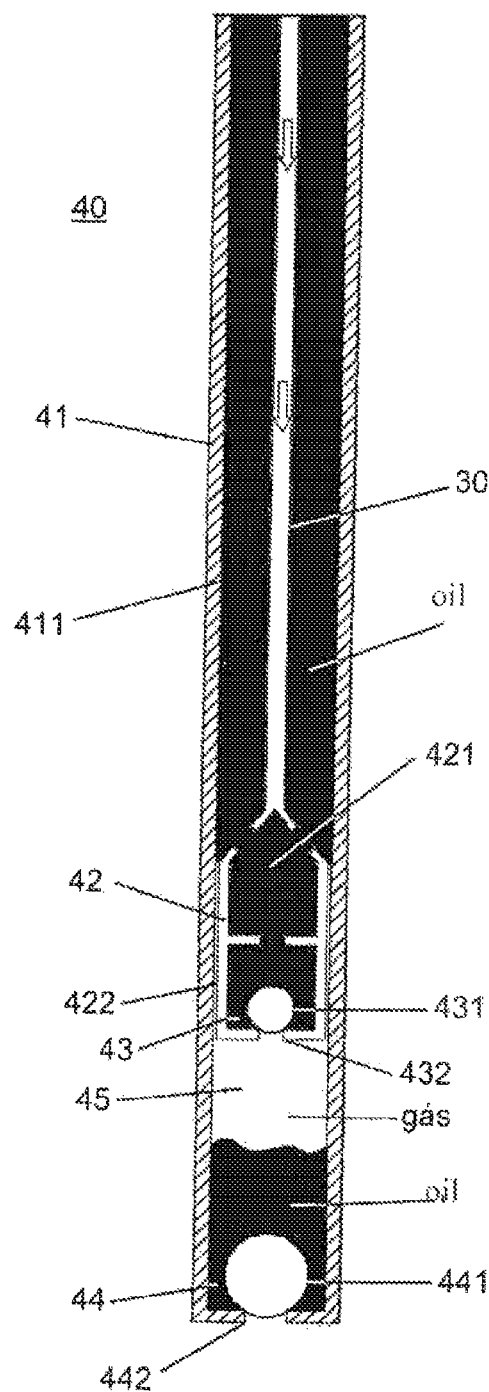
FIG. 6 presents a cut schematic view of an alternative piston pump (40), which is the state of the art, with piston (42) on its end descending position, and compressed gas inside bottom chamber (45).

In more details, as it can be seen on schematics FIG. 4, during the piston (42) ascending movement and subsequent stationary valve opening (44), gas parts are admitted to bottom chamber (45). Those gas parts as they are less dense than oil accumulate on bottom chamber top part (45). Otherwise, it is not possible to open the exhaust valve (43) during piston (42) descending movement, as it can be seen on schematics FIG. 5, as it happens in normal operation. This happens due to the fact that a gas is a compressible fluid, unlike oil. Thus, during piston (42) descending movement, gas does not impose necessary strength for the exhaust valve (43) ball (431) to float, and ends up being compressed. On FIG. 6 it is possible to view the schematics of the above mentioned situation, with compressed gas contained on bottom chamber (45) and without exhaust valve (43) opening. So the gas is compressed and expanded alternately without the exhaust valve (43) opening, i.e., without bottom chamber (45) gas discharge for piston (42) inner chamber (421), thus interrupting the fluid elevation draining.

Aiming to provide a solution for shutdown on gas in fluid elevation draining, for oil extraction mechanical pumping systems problems, as well as aiming to present an alternative solution to that proposed in document BRPI0604983-4, the present invention proposes an improvement for alternative piston pump (40), characterized by its case (41) containing at least one cavity (46) provided along with its inner surface (411).

Figure 7:
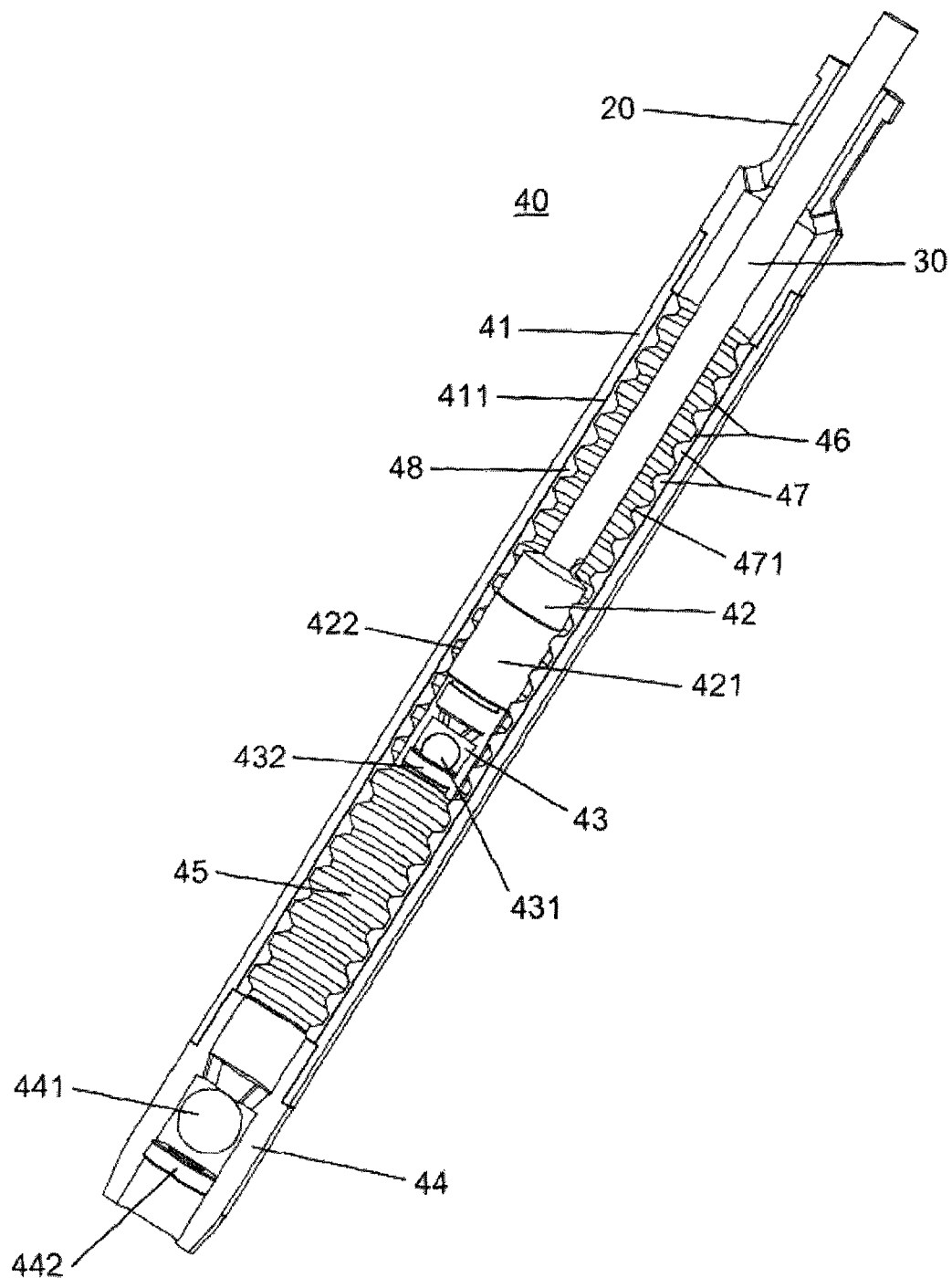
FIG. 7 presents a cut perspective view of an alternative piston pump (40), according to improvement proposed by the invention.
Figure 8:
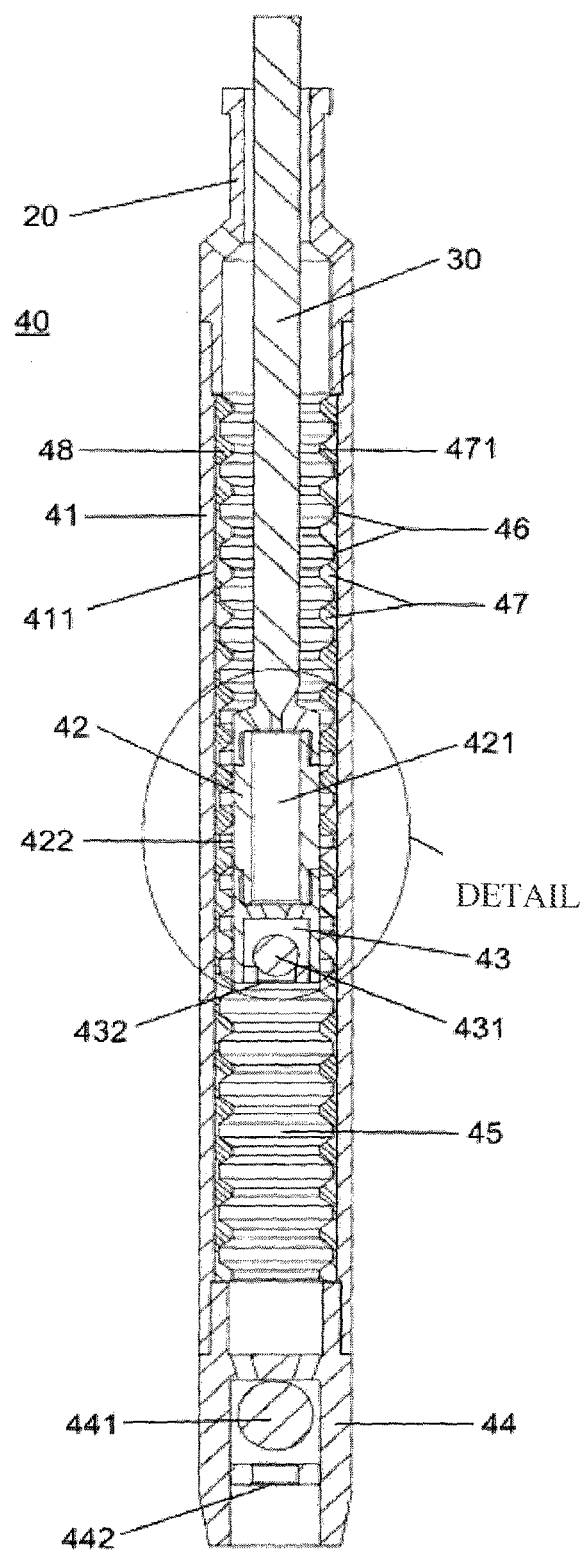
FIG. 8 presents a front view of an alternative piston pump (40), according to improvement proposed by the invention.
Figure 9:
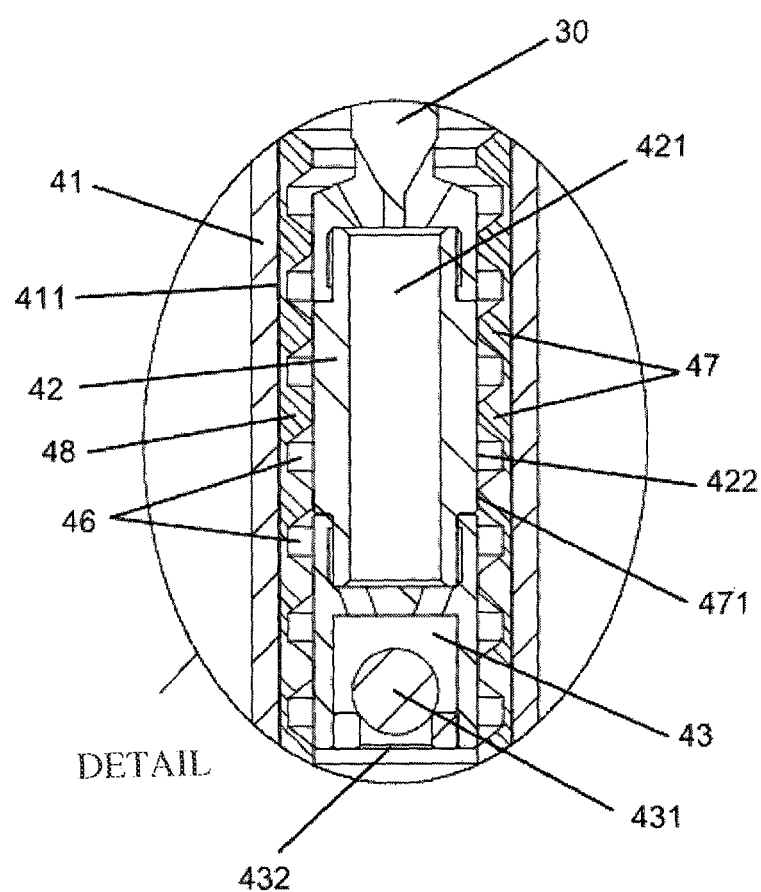
FIG. 9 presents an area detailed view of an alternative piston pump (40) delimited on FIG. 8.

The main invention embodiment, as it can be seen on FIGS. 7, 8 and 9, there are several cavities (46) formed by the empty space between adjacent concentric rings (47) disposed along with the inner surface of a coating (48), where that said coating (48) is inserted on the inner (41) alternative piston pump (40) case surface (411). Also, on the main invention embodiment, the coating (46) is made of rubber, which is manufactured by a vulcanization process.

The concentric ring (47) tops (471) serve as piston guide (42) on its ascending and descending alternative movement, as well as it was performed by a case (41) inner surface (411) on conventional alternative piston pump (40). Besides, the concentric ring (47) tops (471) serve as sealing element with the piston (42) external wall (422), which avoids that a pumped oil now found on the case part (41) above the piston (42) returns to the bottom chamber (45) due to a pressure effect.

Once gas parts are admitted on the bottom chamber (45) through a stationary valve (44), and the exhaust valve (43) opening problem is established due to gas lack of resistance with its subsequent compression, the cavities (46) will serve as gas housing, making it possible, along with the piston alternative ascending and descending movement (42), to be transferred from that said bottom chamber (45) to the case part (41) above piston (42) without passing through the exhaust valve (43).

Figure 10:
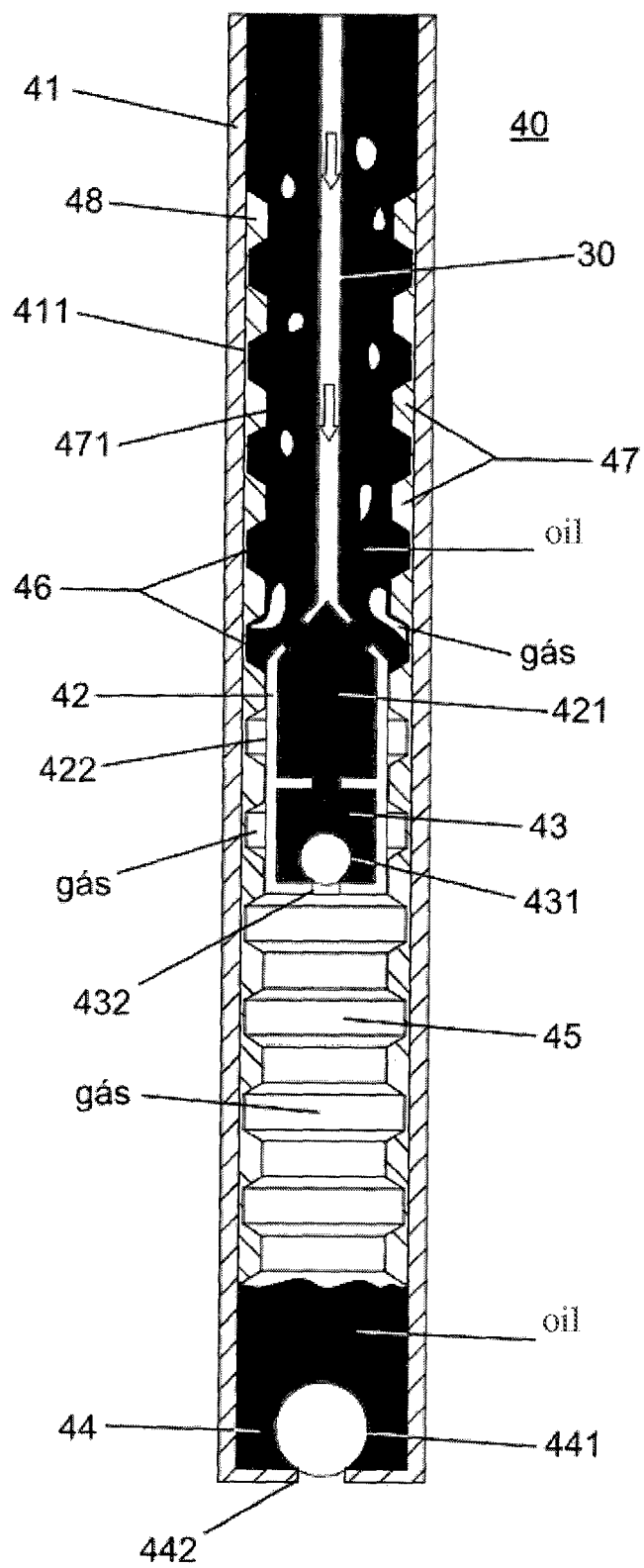
FIG. 10 presents a cut schematic view of an alternative piston pump (40), according to improvement proposed by the invention, with piston (42) on its descending movement, where it can be seen gas housed in the cavities (46) escaping to case part (41) above piston (42).

In more details, as it can be seen on schematic FIG. 10, during the piston (42) descending movement, a gas part contained on bottom chamber (45) is compressed and the other part is housed in the cavities (46), i.e., on spaces between two adjacent concentric rings (47) and piston (42) external wall (422). As the piston (42) develops its descending movement the cavities (46) are released allowing gas contained therein to escape for case part (41) above the piston (42), which is filled with oil. This oil, due to a density difference between the two fluids now is housed in the cavities (46), while gas elevates to the surface by means of the pipe column (20).

Figure 11:
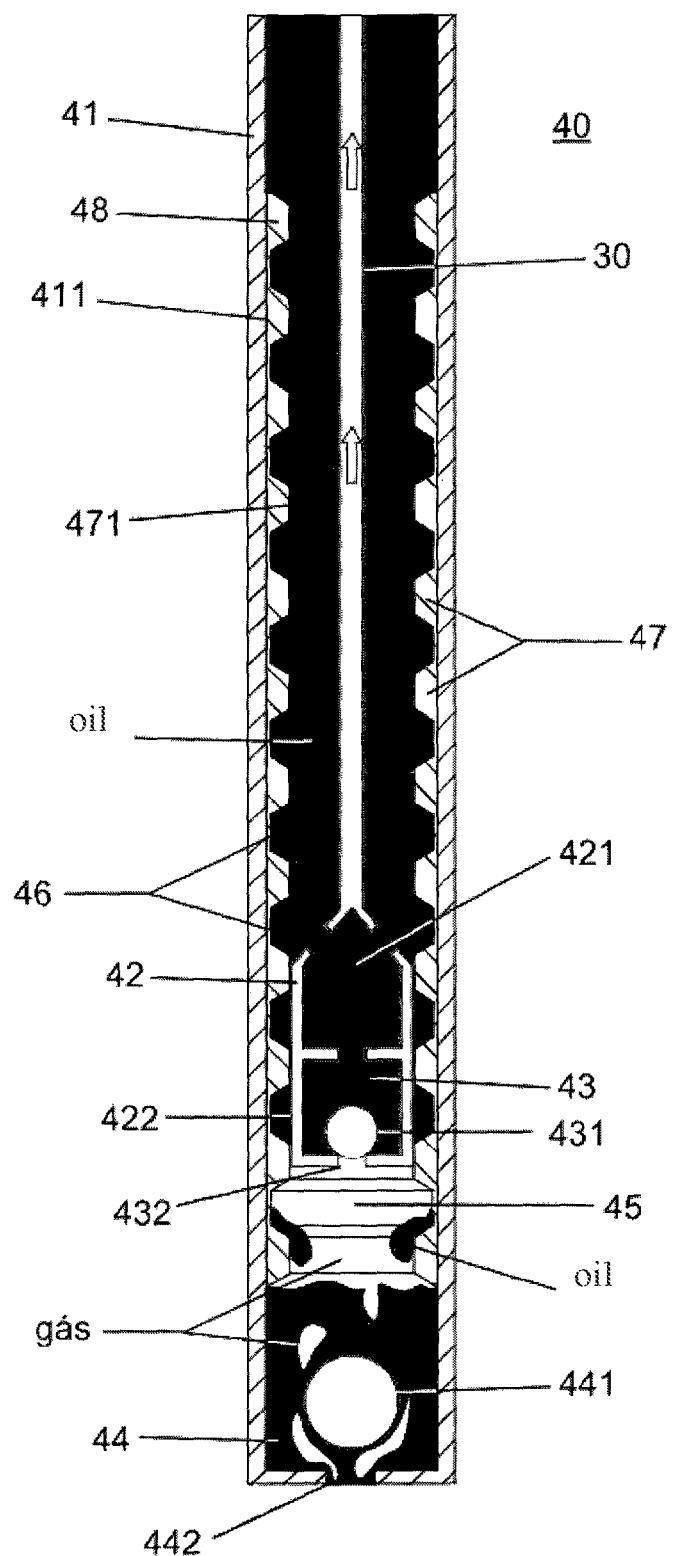
FIG. 11 presents a cut schematic view of an alternative piston pump (40), according to improvement proposed by the invention, with piston (42) on its ascending movement, where it can be seen gas housed in the cavities (46) and its transfer to bottom chamber (45).

During the piston (42) ascending movement, as it can be seen on schematic FIG. 11, there an opposed flow, i.e., oil now housed in the cavities (46) is transferred to the bottom chamber (45). Again, due to a density difference between the two fluids, the transferred oil drains to the case (41) top edge and remaining gas on bottom chamber (45) is expanded and now is housed in the cavities (46).

Thus, during the pumping cycle, a gas transfer from bottom chamber (45) to the case part (41) above piston (42) and an oil transfer from the case part (41) above the piston (42) to the bottom chamber (45) is established. That transfer shall continue up to the moment in which an enough oil amount is contained in the bottom chamber (45) for, on a piston (42) descending movement, impose the necessary resistance for exhaust valve (43) ball (431) floating, in such a way to establish a normal pumping flow, with fluid discharge to the piston (42) inner chamber (421) and from that to pipe column (20) up to the surface.

Figure 12:
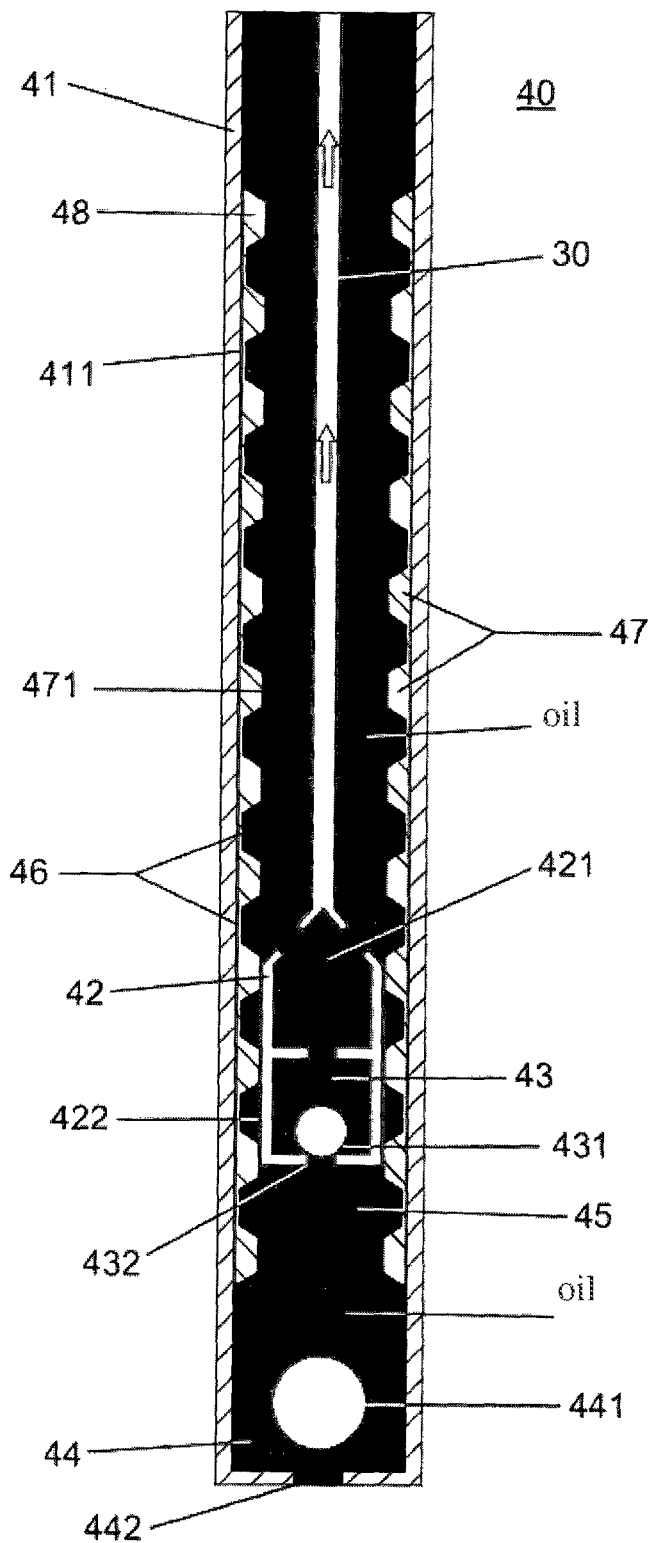
FIG. 12 presents a cut schematic view of an alternative piston pump (40), according to improvement proposed by the invention, with piston (42) on its ascending movement working under normal conditions, without gas presence.
Figure 13:
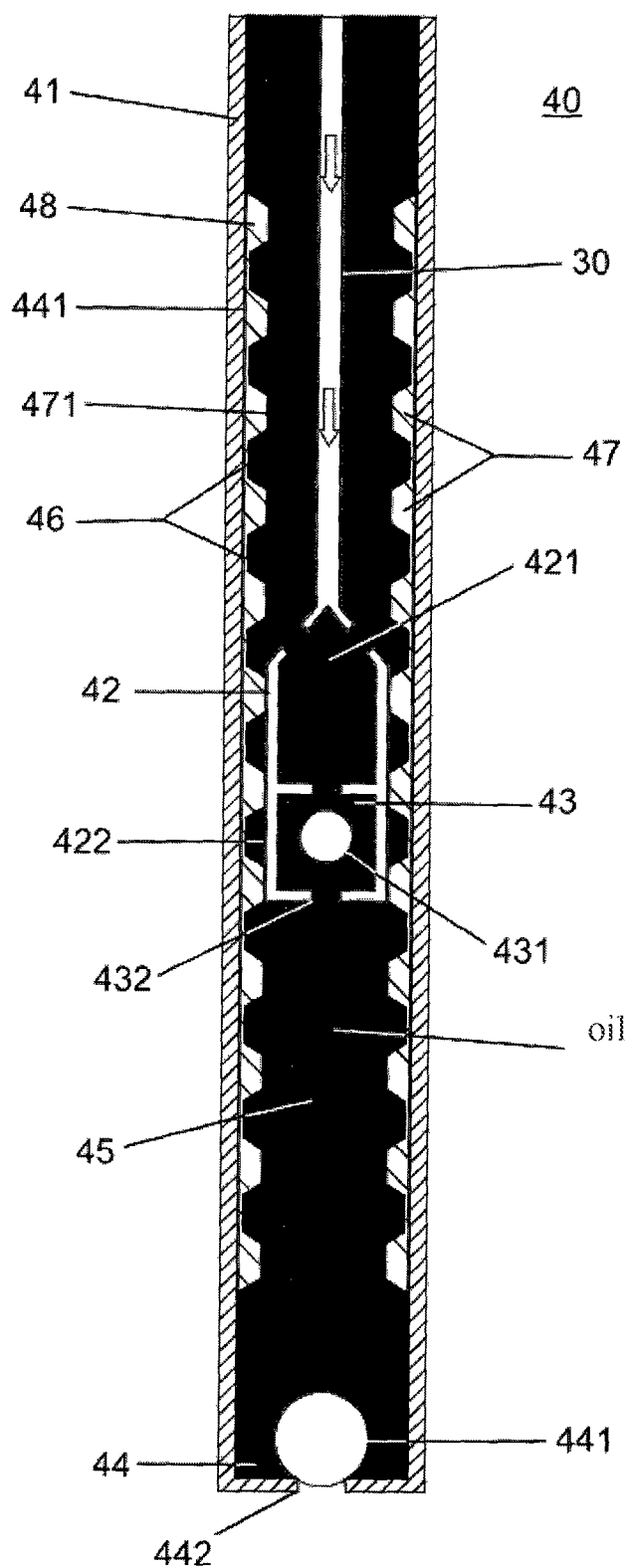
FIG. 13 presents a cut schematic view of an alternative piston pump (40), according to improvement proposed by the invention, with piston (42) on its descending movement working under normal conditions, without gas presence.

When there are no gas parts in the bottom chamber (45), as it can be seen on schematics FIGS. 12 and 13, the alternative piston pump (40), according to the proposed improvement by the invention should work under normal conditions, developing its ascending movement with stationary valve (44) opening and fluid intake in the bottom chamber (45), and its descending movement with exhaust valve opening (43) and fluid discharge in the bottom chamber (45) to the piston (42) inner chamber (421), where oil parts should fill the space cavities (46).

The invention preferential embodiment, the coating (48) with cavities (46) extends along with all inner surface (411) of the case (41), thus optimizing the gas transfer from bottom chamber (45) to case part (41) above the piston (42). However, for a gas transfer it is only necessary that the case (41) length, covered by the coating (48) with cavities (46) and run by the piston (42) travel be longer than piston (42) length.

Existing cavities (46) in the case (41) inner surface (411) shall be obtained by material addition, as it is in the invention preferential embodiment, where a coating (48) with cavities (46) is inserted over a case (41) inner surface (411), and by material removal, for example, by means of rings or holes machining at the case (41) inner surface (411).

In the presented description above, the alternative pump piston (40), according to the invention is intended for application in mechanical pumping systems for oil extraction. Naturally, the invention proposed improvement can be used in alternative piston pumps (40) for other purposes.

Preferential or alternative embodiments herein do not limit invention as a prerogative to described structures, which may vary in equivalent construction, but nevertheless going away from the invention protection scope.

The invention claimed is:

1. An alternative piston pump, comprising:
   a case including an interior surface defining a chamber, the interior surface defining a plurality of alternating protrusions and cavities; and
   a piston slidably disposed within the chamber of the case, the piston defining an external wall configured to sealingly contact the protrusions adjacent the piston to seal off a portion of the chamber above the piston from a portion of the chamber below the piston, the cavities configured to retain gas between the external wall and interior surface upon movement of the piston downwardly through the chamber to permit the transfer of gas from the part of the chamber below the piston to the part of the chamber above the piston between the external wall and the interior surface.

2. The alternative piston pump according to claim 1, wherein the protrusions and cavities are defined by a coating disposed on the interior surface of the case.

3. The alternative piston pump according to claim 1, wherein the protrusions and cavities are defined by holes formed in the interior surface of the case.

4. The alternative piston pump according to claim 1, wherein the plurality of alternating protrusions and cavities extend a first length along the chamber and wherein the piston is slidable within the chamber a second length smaller than the first length.

5. The alternative piston pump according to claim 1, wherein the cavities are further configured to retain oil between the external wall and interior surface upon movement of the piston upwardly through the chamber to permit the transfer of oil from the part of the chamber above the piston to the part of the chamber below the piston between the external wall and the interior surface.

6. The alternative piston pump according to claim 1, wherein the piston includes an exhaust valve configured to open and close an internal passageway defined through the piston to selectively permit the transfer of oil from the part of the chamber below the piston to the part of the chamber above the piston upon movement of the piston downwardly through the chamber.

7. The alternative piston pump according to claim 6, wherein the exhaust valve is a ball-seat valve.

8. The alternative piston pump according to claim 1, further comprising a rod column disposed within the part of the chamber above the piston, the rod column configured to receive gas transferred from the part of the chamber below the piston to the part of the chamber above the piston.

9. The alternative piston pump according to claim 1, wherein the case includes a lower opening and an inflow valve disposed within the lower opening, and wherein movement of the piston upwardly through the chamber opens the inflow valve to draw oil and gas into the portion of the chamber below the piston.

10. The alternative piston pump according to claim 9, wherein the inflow valve is a ball-seat valve.

11. An alternative piston pump, comprising:
a case including an interior surface defining a chamber, the chamber retaining gas and oil, the interior surface defining a plurality of alternating protrusions and cavities; and
a piston defining an exterior wall disposed in sealing contact with the protrusions adjacent the piston to seal off a portion of the chamber above the piston from a portion of the chamber below the piston, the piston including an interior passageway extending through the piston and an exhaust valve disposed within the interior passageway, the piston slidably movable through the chamber of the case from an upper position to a lower position, wherein, upon movement of the piston from the upper position towards the lower position, gas is transferred from the portion of the chamber below the piston to the portion of the chamber above the piston between the exterior wall of the piston and the interior surface of the case via the cavities, and oil is transferred from the portion of the chamber below the piston to the portion of the chamber above the piston through the interior passageway of the piston.

12. The alternative piston pump according to claim 11, wherein the protrusions and cavities are defined by a coating disposed on the interior surface of the case.

13. The alternative piston pump according to claim 11, wherein the protrusions and cavities are defined by holes formed in the interior surface of the case.

14. The alternative piston pump according to claim 11, wherein the plurality of alternating protrusions and cavities extend along the chamber a distance greater than a distance between the upper position and the lower position of the piston.

15. The alternative piston pump according to claim 11, wherein, upon movement of the piston from the lower position towards the upper position, oil is transferred from the portion of the chamber above the piston to the portion of the chamber below the piston between the exterior wall of the piston and the interior surface of the case via the cavities.

16. The alternative piston pump according to claim 11, wherein the exhaust valve is pressure-actuated such that once the pressure within the portion of the chamber below the piston is sufficiently great, the exhaust valve is opened to permit the transfer of oil from the portion of the chamber below the piston to the portion of the chamber above the piston.

17. The alternative piston pump according to claim 16, wherein the exhaust valve is a ball-seat valve.

18. The alternative piston pump according to claim 16, wherein movement of the piston from the upper position towards the lower position increases the pressure within the portion of the chamber below the piston.

19. The alternative piston pump according to claim 11, wherein the case includes a lower opening and an inflow valve disposed within the lower opening, and wherein movement of the piston from the lower position towards the upper position opens the inflow valve to draw oil and gas into the portion of the chamber below the piston.

* * * * *